United States Patent
Kobayashi et al.

(10) Patent No.: US 7,228,001 B2
(45) Date of Patent: Jun. 5, 2007

(54) IMAGE ENCODING METHOD, IMAGE DECODING METHOD, IMAGE ENCODER, IMAGE DECODE, PROGRAM, COMPUTER DATA SIGNAL, AND IMAGE TRANSMISSION SYSTEM

(75) Inventors: Mitsuru Kobayashi, Kanagawa (JP); Minoru Etoh, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 669 days.

(21) Appl. No.: 10/476,376

(22) PCT Filed: Nov. 18, 2002

(86) PCT No.: PCT/JP02/12011

§ 371 (c)(1),
(2), (4) Date: Oct. 30, 2003

(87) PCT Pub. No.: WO03/043345

PCT Pub. Date: May 22, 2003

(65) Prior Publication Data

US 2004/0131269 A1    Jul. 8, 2004

(30) Foreign Application Priority Data

Nov. 16, 2001    (JP) .............................. 2001-352353

(51) Int. Cl.
*G06K 9/36*    (2006.01)
(52) U.S. Cl. ..................................... 382/247
(58) Field of Classification Search ........ 382/232–234, 382/236, 238, 239, 240, 246–248; 348/395.1, 348/403.1, 404.1, 408.1, 420.1, 430.1; 375/240.02, 375/240.11, 240.14, 240.15, 240.18, 240.19, 375/240.23, 240.24
See application file for complete search history.

(56) References Cited

U.S. PATENT DOCUMENTS

| | | | | | |
|---|---|---|---|---|---|
| 5,565,920 | A | * | 10/1996 | Lee et al. .............. | 375/240.11 |
| 5,576,765 | A | * | 11/1996 | Cheney et al. ......... | 375/240.02 |
| 5,592,226 | A | * | 1/1997 | Lee et al. .............. | 375/240.14 |
| 6,198,848 | B1 | * | 3/2001 | Honma et al. .............. | 382/232 |
| 6,915,014 | B1 | * | 7/2005 | Honma et al. .............. | 382/239 |
| 6,941,019 | B1 | * | 9/2005 | Mitchell et al. ............ | 382/232 |

FOREIGN PATENT DOCUMENTS

| JP | 11-341497 | 12/1999 |
|---|---|---|
| JP | 2000-299641 | 10/2000 |

OTHER PUBLICATIONS

VCEG-M10 H-26L Test Model Long Term No. 8 (TML-8) draft0.

* cited by examiner

*Primary Examiner*—Jose L. Couso
(74) *Attorney, Agent, or Firm*—Oblon, Spivak, McClelland, Maier & Neustadt, P.C.

(57) ABSTRACT

Orthogonal transform coefficients D6, which are image data of a coded object, are generated by performing predetermined data transform operations on frame image D1 (Step S100), and coded data D7 is generated (S103) by subjecting the orthogonal transform coefficients D6 to arithmetic coding using a predetermined probability table. Then, in variable-length coding for generating the coded data D7, it is set whether or not a probability table is initialized at the slice layer, and a flag indicating the presence of the initialization is added to a header of a predetermined layer. Thus, the image coding method, image decoding method, image coding apparatus, image decoding apparatus, program, computer data signal, and image transmission system, which are capable of enhancing data compression efficiency by coded data in a manner that a probability table is suitably set over the entire coded data, are realized.

15 Claims, 13 Drawing Sheets

Fig.1

| CHARACTER | APPEARANCE PROBABILITY | SECTION ON NUMBER LINE |
|---|---|---|
| A | 1/10 | [0.00,0.10) |
| C | 1/10 | [0.10,0.20) |
| E | 1/10 | [0.20,0.30) |
| H | 1/10 | [0.30,0.40) |
| I | 2/10 | [0.40,0.60) |
| M | 1/10 | [0.60,0.70) |
| R | 1/10 | [0.70,0.80) |
| T | 2/10 | [0.80,1.00) |

Fig.3

| CODE WORD | PROBABILITY TABLE | | | OUTPUT |
|---|---|---|---|---|
| | LOWER LIMIT | UPPER LIMIT | SECTION LENGTH | |
| 0.0757451536 | 0.0 | 0.1 | 0.1 | A |
| 0.757451536 | 0.7 | 0.8 | 0.1 | R |
| 0.57451536 | 0.4 | 0.6 | 0.2 | I |
| 0.8725768 | 0.8 | 1.0 | 0.2 | T |
| 0.362884 | 0.3 | 0.4 | 0.1 | H |
| 0.62884 | 0.6 | 0.7 | 0.1 | M |
| 0.2884 | 0.2 | 0.3 | 0.1 | E |
| 0.884 | 0.8 | 1.0 | 0.2 | T |
| 0.42 | 0.4 | 0.6 | 0.2 | I |
| 0.1 | 0.1 | 0.2 | 0.1 | C |

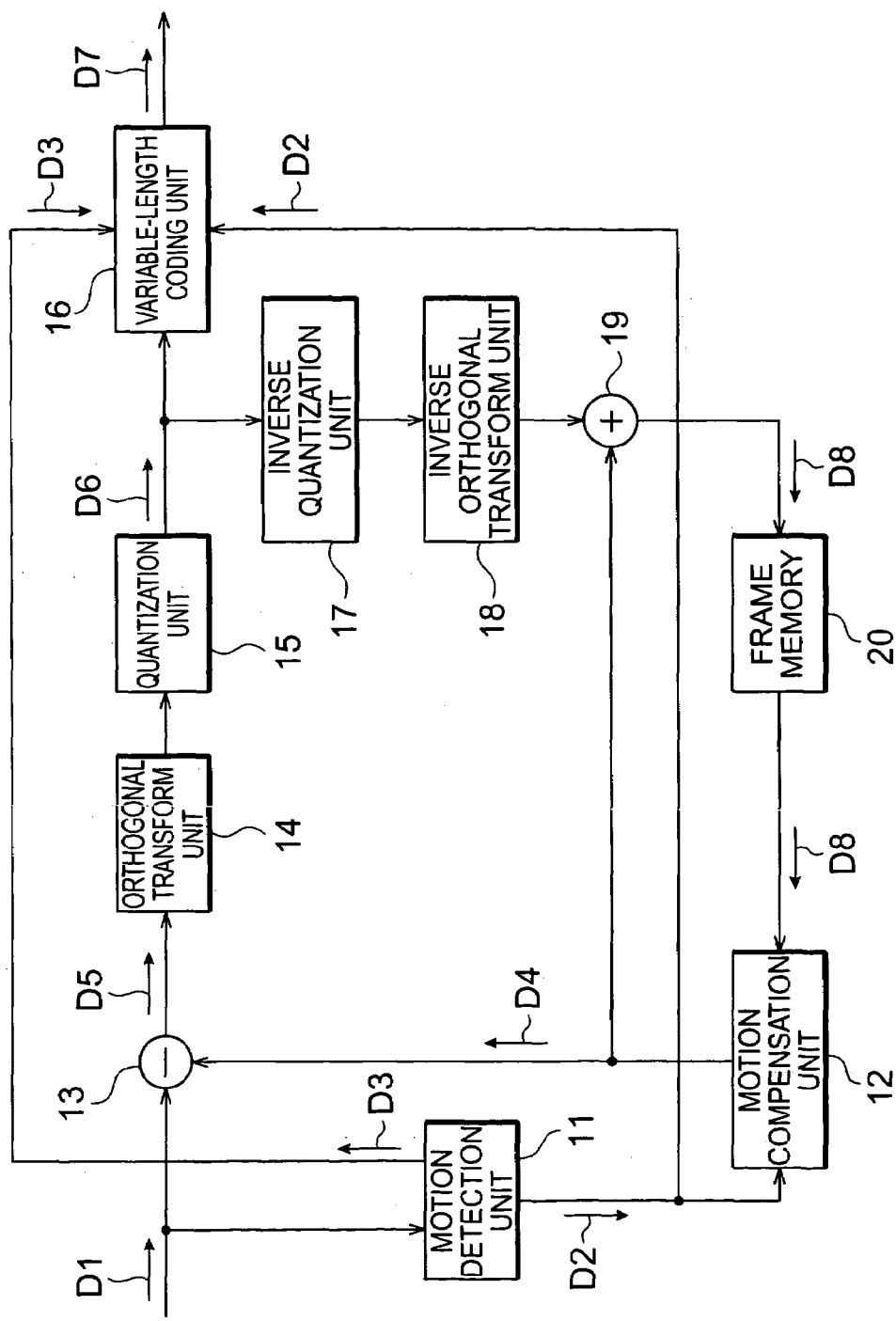

mode0
Skip mode1
Inter
16 × 16 mode2
Inter
16 × 8 mode3
Inter
8 × 16 mode4
Inter
8 × 8 mode5
Inter
8 × 4 mode6
Inter
4 × 8 mode7
Inter
4 × 4 mode8
Intra
4 × 4 mode9
Intra
16 × 16

Fig.8A

HORIZONTAL COORDINATES →

| $a_{11}$ | $a_{12}$ | $a_{13}$ | $a_{14}$ |
|---|---|---|---|
| $a_{21}$ | $a_{22}$ | $a_{23}$ | $a_{24}$ |
| $a_{31}$ | $a_{32}$ | $a_{33}$ | $a_{34}$ |
| $a_{41}$ | $a_{42}$ | $a_{43}$ | $a_{44}$ |

VERTICAL COORDINATES ↓

Fig.8B

HORIZONTAL FREQUENCIES →

| $f_{11}$ | $f_{12}$ | $f_{13}$ | $f_{14}$ |
|---|---|---|---|
| $f_{21}$ | $f_{22}$ | $f_{23}$ | $f_{24}$ |
| $f_{31}$ | $f_{32}$ | $f_{33}$ | $f_{34}$ |
| $f_{41}$ | $f_{42}$ | $f_{43}$ | $f_{44}$ |

VERTICAL FREQUENCIES ↓

IMAGE ENCODING METHOD, IMAGE DECODING METHOD, IMAGE ENCODER, IMAGE DECODE, PROGRAM, COMPUTER DATA SIGNAL, AND IMAGE TRANSMISSION SYSTEM

TECHNICAL FIELD

The present invention relates to an image coding method, an image decoding method, an image coding apparatus, an image decoding apparatus, a program, and a computer data signal which can be suitably applied to an image transmission system such as a mobile video transmission system, and relates to the image transmission system.

BACKGROUND ART

As a coding method for a moving picture, standard moving picture coding methods such as ITU-T H.26x and MPEG series have been heretofore known. In these moving picture coding methods, predetermined data transform operations such as motion compensation (MC) and discrete cosine transform (hereinafter referred to as DCT) are performed for respective images of blocks obtained by dividing a frame image. Thus, image data that is a coded object is prepared.

The image data prepared by the data transform operations further undergoes variable-length coding, and becomes coded data that is compressed data used for an image transfer. As one of such variable-length coding methods, an arithmetic coding (AC) has been used.

In general, in the case of carrying out the arithmetic coding of an information source string (symbol string) formed by combining plural types of symbols, first, certain sections are allocated to the respective symbols in accordance with the appearance probabilities of the symbols on a number line (probability number line) of [0.0, 1.0). In this case, one representing correspondence relationships between the symbols and the sections on the number line is called a probability table. When the information source string undergoes the variable-length coding by the arithmetic coding, code words expressing the information source string on the number line is generated by referring to this probability table.

Here, the arithmetic coding will be described with reference to FIGS. 1 to 3. Specifically, a character string "ARITHMETIC" will be cited as the information source string to be coded, and the arithmetic coding thereof will be exemplified.

Eight types of characters (symbols), which are A, C, E, H, I, M, R and T, appear in the above-described information source string. As shown in the table of FIG. 1, sections are allocated to these characters on the number line (probability number line) of [0.0, 1.0) such that section lengths proportional to the appearance probabilities of the respective characters in the character string can be obtained. The table shown in FIG. 1, which represents these correspondence relationships between the characters and the sections on the number line, becomes a probability table for use in the arithmetic coding.

FIG. 2 is a diagram illustrating the coding of the character string "ARITHMETIC" by use of the probability table shown in FIG. 1. In the arithmetic coding, a section reduction operation based on the probability table is sequentially carried out for the respective symbols included in the information source string, thus generating code words formed by coding the information source string.

In the example shown in FIG. 2, first, the probability table shown in FIG. 1 is referred to for the first character "A" of the character string "ARITHMETIC" to be coded, and the section [0, 1) on the number line is divided into eight sections corresponding to the respective characters. Then, the section is reduced to the section [0.0, 0.1) corresponding to the character "A" among the eight sections. Next, the probability table is referred to for the second character "R", and the section [0.0, 0.1) is divided into eight sections. Subsequently, among these sections, the section is reduced to the section [0.07, 0.08) corresponding to the character "R".

Hereinafter, the coding operations by the section reduction are carried out sequentially for each of the characters. Then, in the section [0.0757451536, 0.0757451552) on the number line finally obtained, a numerical value "0.0757451536" within the section is generated as a code word obtained by performing the arithmetic coding of the character string "ARITHMETIC".

FIG. 3 is a table showing decoding of the code word "0.0757451536" obtained by use of the probability table shown in FIG. 1 to the character string "ARITHMETIC".

In the example shown in FIG. 3, the probability table shown in FIG. 1 is referred to for the code word "0.0757451536" to be decoded, and the section [0.0, 0.1) having a section length of 0.1 in which the code word is included is specified. Then, the character "A" corresponding to the specified section is outputted as the first character, and a new code word "0.757451536" is generated by (code word—lower limit)/(section length). Next, the probability table is referred to for the code word "0.757451536", and a section [0.7, 0.8) having a section length of 0.1 in which the code word is included is specified. Then, the character "R" corresponding to the specified section is outputted as the second character, and a new code word "0.57451536" is generated.

Hereinafter, the decoding operations are sequentially carried out for the code words. Then, the character string "ARITHMETIC" is restored from the code word "0.0757451536" which underwent the arithmetic coding.

As described above, in the variable-length coding of the information source string by use of the arithmetic coding, the symbols included in the information source string and the sections on the number line are allowed to correspond to each other, thus making it possible to express an arbitrary information source string by the code words on the number line of [0.0, 1.0). Moreover, the probability table allowing the symbols and the sections to correspond to each other is set in accordance with the appearance probabilities of the respective symbols, whereby the variable-length coding of the information source string can be performed effectively and the efficiency of data compression by the coding can be enhanced.

DISCLOSURE OF INVENTION

FIG. 4 is a flowchart illustrating an example of an image coding method using the variable-length coding by the foregoing arithmetic coding. In the image coding method shown in FIG. 4, arithmetic coding of image data is carried out by a method called CABAC (Context-based Adaptive Binary Arithmetic Coding) using context modeling which is used in ITU-T H.26L video coding system (refer to VCEG-M10 H.26L Test Model Long Term Number 8 (TML-8) draft0).

In the coding of the image data, an image to be coded is first divided into blocks having a predetermined size, and intra-frame coding, inter-frame coding, and necessary data transform processing such as an orthogonal transform including the DCT are carried out for each of the blocks. Then, image data expressing an image in each block is generated. Subsequently, the variable-length coding is carried out for the image data by use of the arithmetic coding or the like, and coded data subjected to data compression is generated.

Particularly, in the image coding method shown in FIG. 4, the coding is not carried out under conditions that are set fixedly in advance, but the context modeling is carried out when the image data for each block is coded (Step S901, Context Modeling). In the arithmetic coding using the context modeling, with regard to the probability table for use in the coding of the image data, a probability table to be applied to the image data in the block to be coded is set so as to be switched with reference to coding conditions such as processing results of image coding in blocks adjacent thereto.

When the setting of the probability table by the context modeling is terminated, the image data to be coded (for example, a plurality of DCT coefficients) is binarized, and a data string to be transmitted is generated (S902, Binarization). Then, the arithmetic coding is carried out for the binarized data string (S903, Adaptive Binary Arithmetic Coding), and the coded data is obtained.

Specifically, the probability table set by the context modeling is allocated to each bit of the binarized data string, and probability estimation is carried out (S904, Probability Estimation). Then, the data string undergoes the arithmetic coding by use of the allocated probability tables, and the code words on the number line, which are the coded data, are generated (S905, Arithmetic Coding). Moreover, information such as occurrence frequencies of the coded bits is feedbacked to the probability table based on processing results of the arithmetic coding, and thus the probability estimation is updated, and the coding trend is reflected on the probability table (S906, Probability Estimation Update).

According to the foregoing image coding method by the arithmetic coding using the context modeling, the probability table to be used is switched in accordance with the coding conditions and the processing results, thus making it possible to decrease the redundancy in the coded data.

In some cases, coded data obtained by coding a frame image is prepared by dividing a frame layer corresponding to the frame image into one or a plurality of slice layers. The slice layer is used for enhancing an efficiency of the data multiplexing and data transmission, or for suppressing an influence of a transmission error occurrence.

Meanwhile, at the slice layer, a probability table applied to the arithmetic coding is initialized. The above initialization of the probability table has an effect enabling to resume decoding after the occurrence of the error. However, as shown in FIG. 4, when the arithmetic coding is performed in such a manner that a coding tendency is reflected on the probability table, there is a problem that information reflected on the probability table is lost by the initialization of the probability table at the slice layer.

Namely, for the probability table used in the initialization, a fixed probability table is normally used regardless of an image of a coded object. Therefore, when the initialization is performed in accordance with a probability table unsuitable for the image, a coding efficiency is lowered at each initialization. Moreover, for the coded bit with low occurrence frequency, the probability table undergoes the initialization before the coding tendency is reflected on the probability table, and the coding efficiency is thereby lowered.

Moreover, the initialization is performed for recovering after the occurrence of the transmission error as above, however, the transmission error may not occur in the transmission path. In the case that the transmission error does not occur, or in the case that the transmission error occurrence frequency is low, the initialization of the probability table is inefficient. Thus, in the case that the probability table is unnecessarily initialized at the slice layer, data compression efficiency by coded data is thereby lowered.

The present invention is made for solving the above problems. An object of the present invention is to provide image coding method, image decoding method, image coding apparatus, image decoding apparatus, program, computer data signal, and image transmission system, which are capable of enhancing the efficiency of the data compression by the coded data in a manner that the probability table is suitably set over the entire coded data having a hierarchy structure composed of a slice layer and a frame layer.

In order to achieve the above object, the image coding method according to the present invention is a coding method for dividing a frame image into blocks of a specific size and coding image data for each of the blocks, the method comprising: (1) a transform step of preparing image data that is a coded object by performing a predetermined data transform operation for respective images of the blocks in the frame image; and (2) a coding step of subjecting the image data to variable-length coding by arithmetic coding using a predetermined probability table and of generating coded data having a hierarchy structure composed of a slice layer made of a plurality of the blocks, and a frame layer which is made of one or a plurality of the slice layers and corresponds to the frame image, (3) wherein, in the coding step, the presence of initialization of the probability table is set for the slice layer, a flag indicating the set presence of the initialization is added to a header of a predetermined layer of the coded data including the slice layer, and the probability table is initialized when the initialization is set to be present.

Similarly, the image coding apparatus according to the present invention is a coding apparatus for dividing a frame image into blocks of a specific size and coding image data for each of the blocks, the apparatus comprising: (1) transform means for preparing image data that is a coded object by performing a predetermined data transform operation for respective images of the blocks in the frame image; and (2) coding means for subjecting the image data to variable-length coding by arithmetic coding using a predetermined probability table and for generating coded data having a hierarchy structure composed of a slice layer made of a plurality of the blocks, and a frame layer which is made of one or a plurality of the slice layers and corresponds to the frame image, (3) wherein, by the coding means, the presence of initialization of the probability table is set for the slice layer, a flag indicating the set presence of the initialization is added to a header of a predetermined layer of the coded data including the slice layer, and the probability table is initialized when the initialization is set to be present.

Similarly, the image coding program according to the present invention is a program for causing a computer to execute the above-mentioned image coding method. Further, the computer data signal according to the present invention is a data signal embodied in carrier wave for carrying an image coding program for causing a computer to execute the above-mentioned image coding method.

In the foregoing image coding method, apparatus, program, and computer data signal, after obtaining image data of a coded object by performing a data transform operation, such as the motion compensation and orthogonal transform, for a frame image, the obtained image data is subjected to the arithmetic coding by use of a predetermined probability table, thereby generating coded data subjected to data compression. Then, according to the variable-length coding for generating the coded data, it is set for the slice layer, whether or not the probability table is initialized at the slice layer. At the same time, to the header of a specific layer, a flag indicating presence of the initialization is added.

Accordingly, unnecessary initialization of the probability table at the slice layer can be prevented. Therefore, the probability table is suitably set over the entire coded data having the hierarchy structure composed of slice layers and frame layers, and the data compression efficiency by the coded data can be enhanced.

Moreover, the image decoding method according to the present invention is a decoding method for dividing a frame image into blocks of a specific size and decoding coded data obtained by coding image data for each of the blocks, the method comprising: (1) a decoding step of generating image data by subjecting the coded data to variable-length decoding by inverse arithmetic coding using a predetermined probability table, the coded data having a hierarchy structure composed of a slice layer made of a plurality of the blocks, and a frame layer which is made of one or a plurality of the slice layers and corresponds to the frame image; and (2) a restoration step of restoring the frame image by performing a predetermined data restoration operation for the image data of the respective blocks in the frame image, (3) wherein, in the decoding step, from a header of a predetermined layer in the coded data including the slice layer, a flag indicating the presence of initialization of the probability table with respect to the slice layer is read, the presence of the initialization of the probability table is set, and the probability table is initialized when the initialization is set to be present.

Similarly, the image decoding apparatus according to the present invention is a decoding apparatus for dividing a frame image into blocks of a specific size and decoding coded data obtained by coding image data for each of the blocks, the apparatus comprising: (1) decoding means for generating image data by subjecting the coded data to variable-length decoding by inverse arithmetic coding using a predetermined probability table, the coded data having a hierarchy structure composed of a slice layer made of a plurality of the blocks, and a frame layer which is made of one or a plurality of the slice layers and corresponds to the frame image; and (2) restoration means for restoring the frame image by performing a predetermined data restoration operation for the image data of the respective blocks in the frame image, (3) wherein, by the decoding means, from a header of a predetermined layer in the coded data including the slice layer, a flag indicating the presence of initialization of the probability table with respect to the slice layer is read, the presence of the initialization of the probability table is set, and the probability table is initialized when the initialization is set to be present.

Similarly, the image decoding program according to the present invention is a program for causing a computer to execute the above-mentioned image decoding method. Further, the computer data signal according to the present invention is a data signal embodied in carrier wave for carrying an image decoding program for causing a computer to execute the above-mentioned image decoding method.

In the foregoing image decoding method, apparatus, program, and computer data signal, after obtaining image data by performing inverse arithmetic coding for coded data by use of a predetermined probability table, a data restoration operation is performed for the obtained image data, thereby restoring a frame image. Then, according to variable-length decoding for decoding the coded data, for the slice layer, it is set whether or not the probability table is initialized at the slice layer, by use of the flag indicating presence of the initialization, which is read from the header of a specific layer.

Similarly to the foregoing case of the arithmetic coding, unnecessary initialization of the probability table at the slice layer can be accordingly prevented. Therefore, from the coded data with the enhanced efficiency of the data compression, which is obtained by suitably setting the probability table over the entire coded data having the hierarchy structure composed of slice layers and frame layers, the frame image can be suitably restored.

Moreover, the image transmission system according to the present invention is an image transmission system for dividing a frame image into blocks of a specific size and transmitting the frame image in accordance with coded data obtained by coding image data for each of the blocks, the system comprising: (1) the above-mentioned image coding apparatus, which generates the coded data from the frame image and outputs the coded data; and (2) the above-mentioned image decoding apparatus, which receives the coded data from the image coding apparatus and restores the frame image.

With such image transmission system, the image can be transmitted efficiently by use of the coded data with the enhanced efficiency of the data compression, which has the probability table suitably set over the entire coded data.

BRIEF DESCRIPTION OF DRAWINGS

FIG. 1 is a table showing an example of a probability table used for arithmetic coding.

FIG. 3 is a view illustrating decoding of a character string by use of the probability table shown in FIG. 1.

FIG. 6 is a block diagram illustrating a constitution of one embodiment of an image coding apparatus.

FIGS. 8A and 8B are diagrams illustrating an orthogonal transform of image data.

BEST MODE FOR CARRYING OUT THE INVENTION

Figure 2:
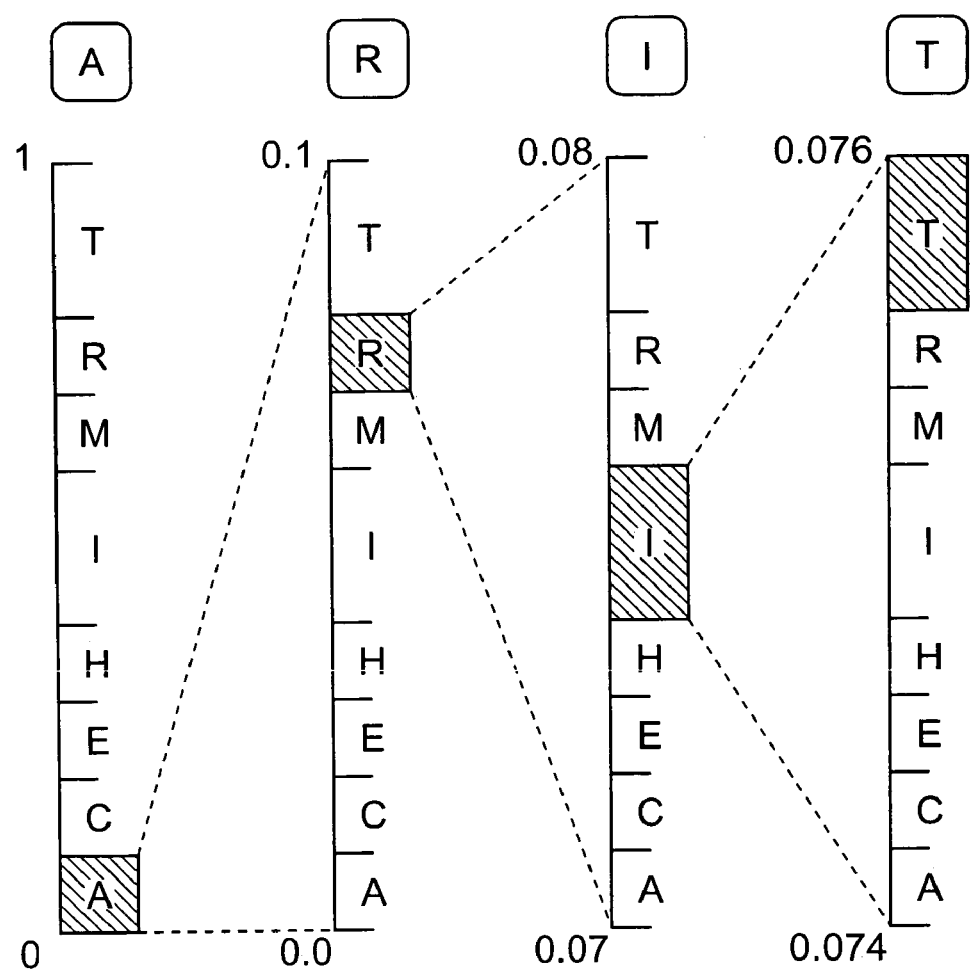
FIG. 2 is a view illustrating coding of a character string by use of the probability table shown in FIG. 1.
Figure 4:
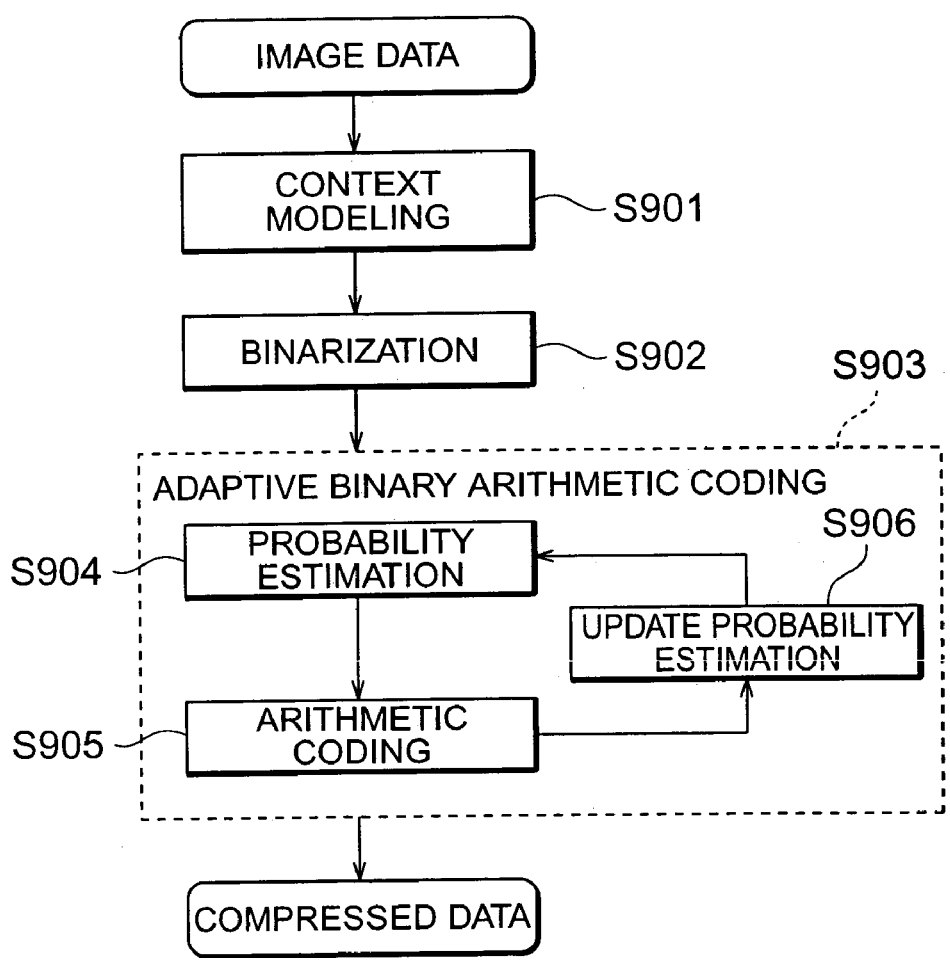
FIG. 4 is a flowchart showing an example of the image coding method using the arithmetic coding.

Description will be made below in detail with reference to the drawings for preferred embodiments of an image coding method, an image decoding method, an image coding apparatus, an image decoding apparatus, a program, a computer data signal, and an image transmission system using these methods and apparatuses, all of which are according to the present invention. Note that, in descriptions of the drawings, the same reference numerals will be added to the same elements, and repeated explanations will be omitted. Moreover, dimension ratios of the drawings do not always coincide with those in the descriptions thereof.

First, the image coding method and the image coding apparatus will be described.

Figure 5:
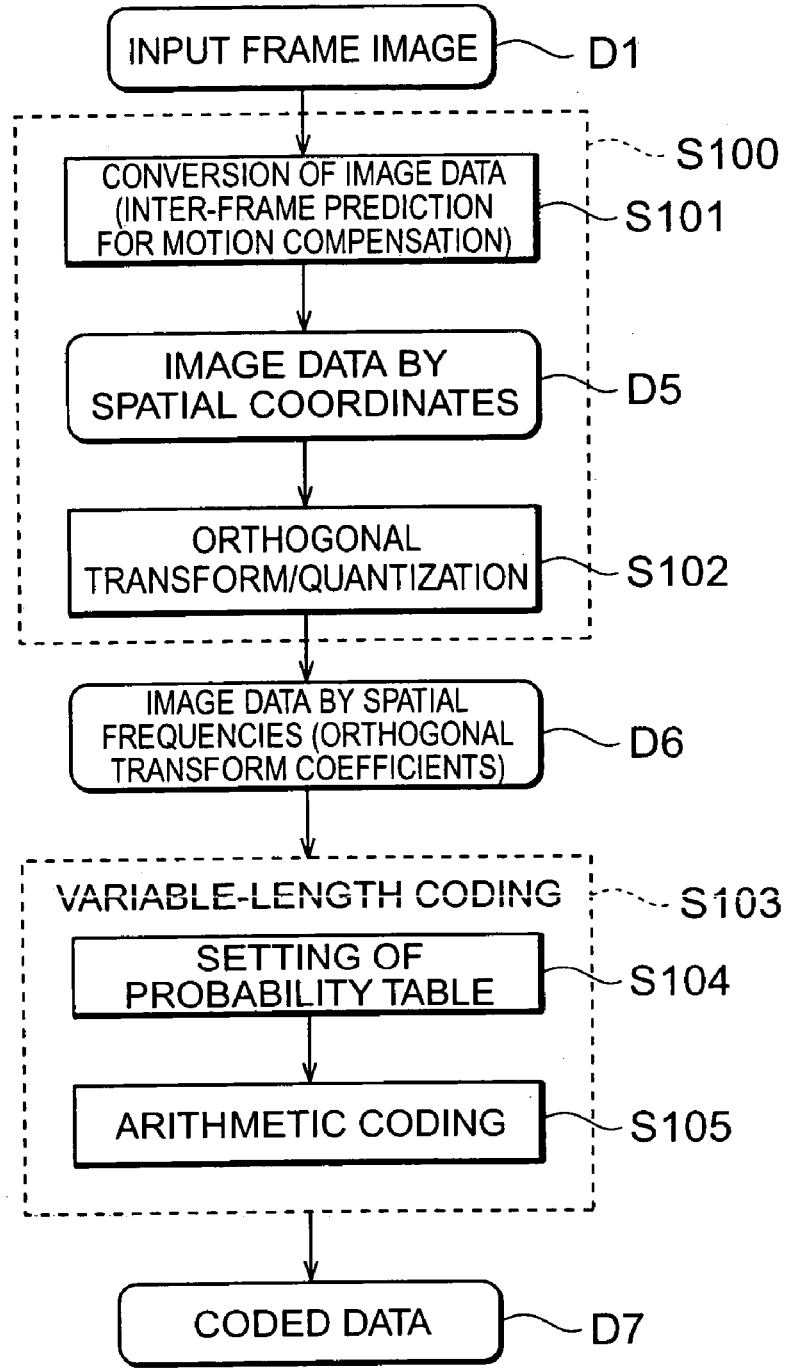
FIG. 5 is a flowchart schematically showing one embodiment of an image coding method.
Figure 7A:
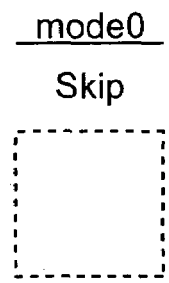
FIGS. 7A to 7J are schematic diagrams illustrating an example of coding modes for use in motion compensation.
Figure 7B:
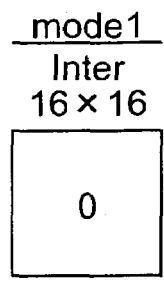
Figure 7C:
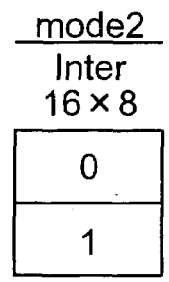
Figure 7D:
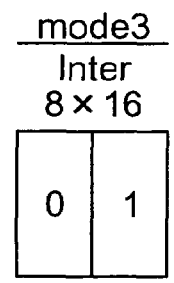
Figure 7E:
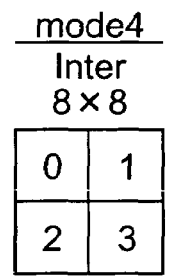
Figure 7F:
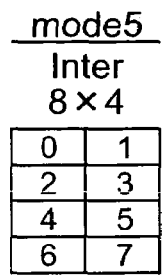
Figure 7G:
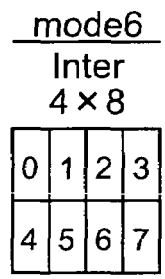
Figure 7H:
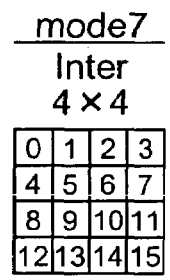
Figure 7I:
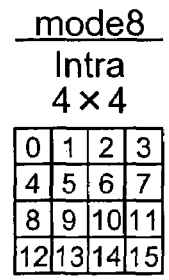
Figure 7J:
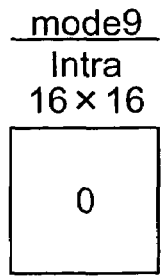

FIG. 5 is a flowchart schematically showing one embodiment of the image coding method according to the present invention. This coding method is an image coding method, in which predetermined data transform and coding operations are carried out for an input frame image D1 as a frame image in a static image or a moving picture, and coded data D7 subjected to data compression is generated, the coded data D7 being transmittable in the image transmission system such as a mobile video transmission system.

In the image coding method shown in FIG. 5, the input frame image D1 is first divided into blocks, each of which has a predetermined size (a predetermined number of pixels), and predetermined data transform operations are performed for respective images of the blocks in the frame image D1, thus preparing image data D6 that is a coded object (Step S100, a transform step). In the embodiment, this transform step is composed of two steps, which are S101 and S102.

Specifically, image data is transformed by performing the predetermined data processing operation for the frame image D1, thus obtaining image data (spatial image data) D5 represented by spatial coordinates (Step S101). For the data processing operations performed herein, there is, for example, motion compensation (MC) inter-frame prediction in the case of performing inter-frame coding for frame images of a moving picture. Moreover, in the case of performing intra-frame coding for the frame images, for example, the image data of the input frame image D1 itself becomes the spatial image data D5.

Next, by performing a orthogonal transform operation for the spatial image data D5, a plurality of orthogonal transform coefficients D6 are generated, which are image data (frequency image data) represented by an spatial frequency (S102, an orthogonal transform step). This orthogonal transform is performed for each of the blocks obtained by dividing the frame image, and the respective orthogonal transform coefficients D6 are obtained for the respective blocks included in the input frame image D1. Moreover, a quantization operation is further performed for the orthogonal transform coefficients according to the need, and thus orthogonal transform coefficients (quantization coefficients) to be the image data of the coded object are generated.

Subsequently, variable-length coding is carried out for the plurality of orthogonal transform coefficients D6 by use of the arithmetic coding, and the coded data D7 as compressed data is generated (S103, coding step). Specifically, a predetermined probability table is set as the probability table applied to the orthogonal transform coefficients D6 (S104). Then, the orthogonal transform coefficients D6 undergo the arithmetic coding by use of the set probability table (S105), thus obtaining the coded data D7.

In the image coding method of the embodiment, for the coded data D7 obtained by subjecting the orthogonal transform coefficients D6, which are the image data of the coded object, to the arithmetic coding, coded data is generated so as to have a hierarchy structure composed of a slice layer and a frame layer. Each slice layer is composed of a plurality of blocks. Moreover, each frame layer is composed of one or a plurality of the slice layers and corresponds to the frame image.

The slice layer is used for enhancing an efficiency of the data multiplexing and data transmission, or for suppressing an influence of a transmission error occurrence. Further, in the slice layer, normally, the probability table applied to the arithmetic coding is simultaneously initialized. As opposed to the above, in the image coding method of the present invention, the presence of the initialization of the probability table is set for each slice layer, a flag indicating the set presence of the initialization is added to a header of a predetermined layer of the coded data D7 including the above slice layer, and the probability table is initialized when the initialization is set to be present.

The effect of the image coding method according to this embodiment will be described.

In the image coding method shown in FIG. 5, after obtaining the image data D6 of the coded object by performing the data transform operations, such as the motion compensation and the orthogonal transform, for the frame image D1, the image data D6 is subjected to the arithmetic coding by use of the predetermined probability table, thus generating the coded data D7 subjected to the data compression. Then, according to variable-length coding for generating the coded data D7, for the respective slice layer, it is set whether or not the probability table is initialized at the slice layer, and the flag indicating the presence of the initialization is added to the header of the predetermined layer.

Accordingly, unnecessary initialization of the probability table at the slice layer can be prevented. Therefore, the probability table is suitably set over the entire coded data D7 having the hierarchy structure composed of slice layers and frame layers, and the data compression efficiency by the coded data D7 can be enhanced. Note that a specific method for adding a flag and the like will be described later in detail.

FIG. 6 is a block diagram illustrating a constitution of one embodiment of the image coding apparatus according to the present invention. Description will be further made below for the image coding method shown in FIG. 5 with reference to the image coding apparatus shown in FIG. 6. Note that, in the following description, a moving picture composed of time-series frame images is mainly assumed as an object to be coded with regard to the input frame image D1 inputted to the image coding apparatus. However, the image coding method and apparatus according to the present invention can be applied similarly also to a static image composed of one frame.

The input frame image D1 to be inputted as an object to be coded is first divided into square image blocks, each having a size of 16 pixels×16 lines. Each of these image blocks is an image block serving as a unit for data processing such as motion compensation, and is called a macroblock. Note that a DCT block having a size of 4 pixels×4 lines is used in the DCT (orthogonal transform) to be described later, for example, in the H.26L coding scheme. In this case, one macroblock has sixteen luma blocks and eight chroma blocks in the DCT. The image coding is carried out for each of the blocks.

The frame image D1 is inputted to transform means constituted by including a motion detection unit 11, a motion compensation unit 12, a subtracter 13, an orthogonal transform unit 14 and a quantization unit 15. The transform means performs a predetermined data transform operation for respective images of blocks in the frame image D1, and prepares the image data D6 to be the coded object.

First, the frame image D1 is inputted to the motion detection unit 11, and the motion of the image is detected for each macroblock. The motion detection unit 11 compares image data in the macroblock, from which the motion is to be detected, with image data in other macroblocks in the input frame image or other frame images. Thus, the motion detection unit 11 detects the motion vector D2 indicating the motion of the image.

Specifically, the motion detection unit 11 refers to a specified image area in the locally decoded image D8 as a frame image having been coded, the image D8 being stored in the frame memory 20. Then, the motion detection unit 11 finds out a pattern analogous to the macroblock of the input frame image D1 to be coded currently. Subsequently, the motion detection unit 11 determines the motion vector D2 by a spatial movement amount between the analogous pattern and the macroblock. Moreover, in this event, a coding mode for use in the motion compensation in the macroblock is selected from a plurality of coding modes prepared for the motion compensation.

FIGS. 7A to 7J are schematic diagrams illustrating an example of coding modes prepared for the motion compensation. In the coding modes exemplified in FIGS. 7A to 7J, there are prepared ten coding modes including: the skip mode 0 in which the motion compensation is not carried out; the inter modes 1 to 7 in which the inter-frame coding is carried out by use of block partitions to blocks for motion compensation, the block partitions being different from one another; and the intra modes 8 and 9 in which the intra-frame coding is carried out by use of block partitions different from each other. Note that the foregoing motion vector D2 is imparted to each macroblock for each of the partitioned blocks for motion compensation.

After the motion vector D2 is obtained, a motion prediction image is generated in the motion compensation unit 12 by use of the motion vector D2 from the motion detection unit 11 and the locally decoded image D8 from the frame memory 20. The motion vectors D2 are determined for the entire macroblocks included in the frame image D1 to generate the motion prediction image, thus obtaining the prediction frame image D4 for the input frame image D1. Subsequently, in the subtractor 13, the difference (prediction residual) frame image D5 between the input frame image D1 and the prediction frame image D4 is generated. Moreover, in the case where the prediction frame image D4 is not prepared, the input frame image D1 is used as the frame image D5 as it is.

The image data of the difference frame image D5 is inputted to the orthogonal transform unit (orthogonal transform means) 14. In the orthogonal transform unit 14, the orthogonal transform is carried out to the difference frame image D5 by the spatial coordinates for each of the orthogonal transform blocks (for example, sixteen luma blocks and eight chroma blocks) included in the macroblock. Then, orthogonal transform coefficients, which are frequency image data, are generated. Moreover, the orthogonal transform coefficients are quantized by a predetermined quantization parameter in the quantization unit 15, and thus the final orthogonal transform coefficient (quantization coefficient) D6 to be the image data subjected to the arithmetic coding is obtained.

FIGS. 8A and 8B are diagrams illustrating an orthogonal transform of image data. The image data of each block divided for the purpose of the orthogonal transform in the frame image D5 is spatial image data. As exemplified by sixteen (4×4) image components in FIG. 8A, the image data is represented by 4×4 spatial image components $a_{11}$ to $a_{44}$ defined by the horizontal and vertical coordinates. The orthogonal transform unit 14 transforms the spatial image data into the image data shown in FIG. 8B by the orthogonal transform using a predetermined transform method. This image data is frequency image data, which is represented by the orthogonal transform coefficients $f_{11}$ to $f_{44}$ as 4×4 frequency image components defined by the horizontal and vertical frequencies.

As a specific orthogonal transform, for example, the DCT (discrete cosine transform) can be applied. The DCT is an orthogonal transform using a term of cosine in the Fourier transform, and is often used in the image coding. The DCT is carried out for the spatial image data, and thus the DCT coefficients $f_{11}$ to $f_{44}$ as the frequency image data are generated. Note that, as shown in FIGS. 8A and 8B, the 4×4 DCT blocks are used as blocks for the orthogonal transform in the DCT, for example, in the H.26L coding scheme.

The orthogonal transform coefficients D6 generated by the orthogonal transform unit 14 and the quantization unit 15 undergo the variable-length coding by arithmetic coding using a predetermined probability table in the variable-length coding unit (coding means) 16. Thus, the coded data D7 as the compressed data of the input frame image D1 is generated.

Specifically, two-dimensional data of the orthogonal transform coefficients D6 shown in FIG. 8B is, for example, transformed into one-dimensional data by a zigzag scan and is further transformed into Level and Run data. Thereafter, the data thus obtained is binarized. Then, by subjecting a binary pattern obtained to the arithmetic coding, the coded data D7 is prepared.

Moreover, in addition to the orthogonal transform coefficients D6, the motion vector D2 detected by the motion detection unit 11 and the coding mode information D3 showing the coding mode selected in the motion detection unit 11 are inputted to the variable-length coding unit 16. These motion vector D2 and coding mode information D3 undergo the variable-length coding by the arithmetic coding using a predetermined probability table in the variable-length coding unit 16 similarly to the orthogonal transform coefficients D6, and then are multiplexed on the coded data D7.

Here, regarding the setting and the initialization of the probability table for use in the arithmetic coding in the variable-length coding unit 16, the setting of the presence of the initialization to the slice layer, and the addition of the flag to the coded data, the same processing as that described above regarding the image coding method shown in FIG. 5 is carried out. Moreover, a probability table different from that used for the arithmetic coding of the orthogonal transform coefficients D6 is usually used in the arithmetic coding of the motion vector D2 and the coding mode information D3. Moreover, also in the arithmetic coding of the orthogonal transform coefficients D6, different probability tables may be used for the arithmetic coding of the luma blocks and for the arithmetic coding of the chroma blocks.

Furthermore, the orthogonal transform coefficients D6 generated in the orthogonal transform unit 14 and the quantization unit 15 are decoded by the inverse quantization unit 17 and the inverse orthogonal transform unit 18 in this image coding apparatus. Then, the decoded image data and the prediction frame image D4 are added together in the adder 19, and the locally decoded image D8 is generated. This locally decoded image D8 is stored in the frame memory 20, and is utilized for the motion compensation of other frame images.

Next, the image decoding method and the image decoding apparatus will be described.

Figure 9:
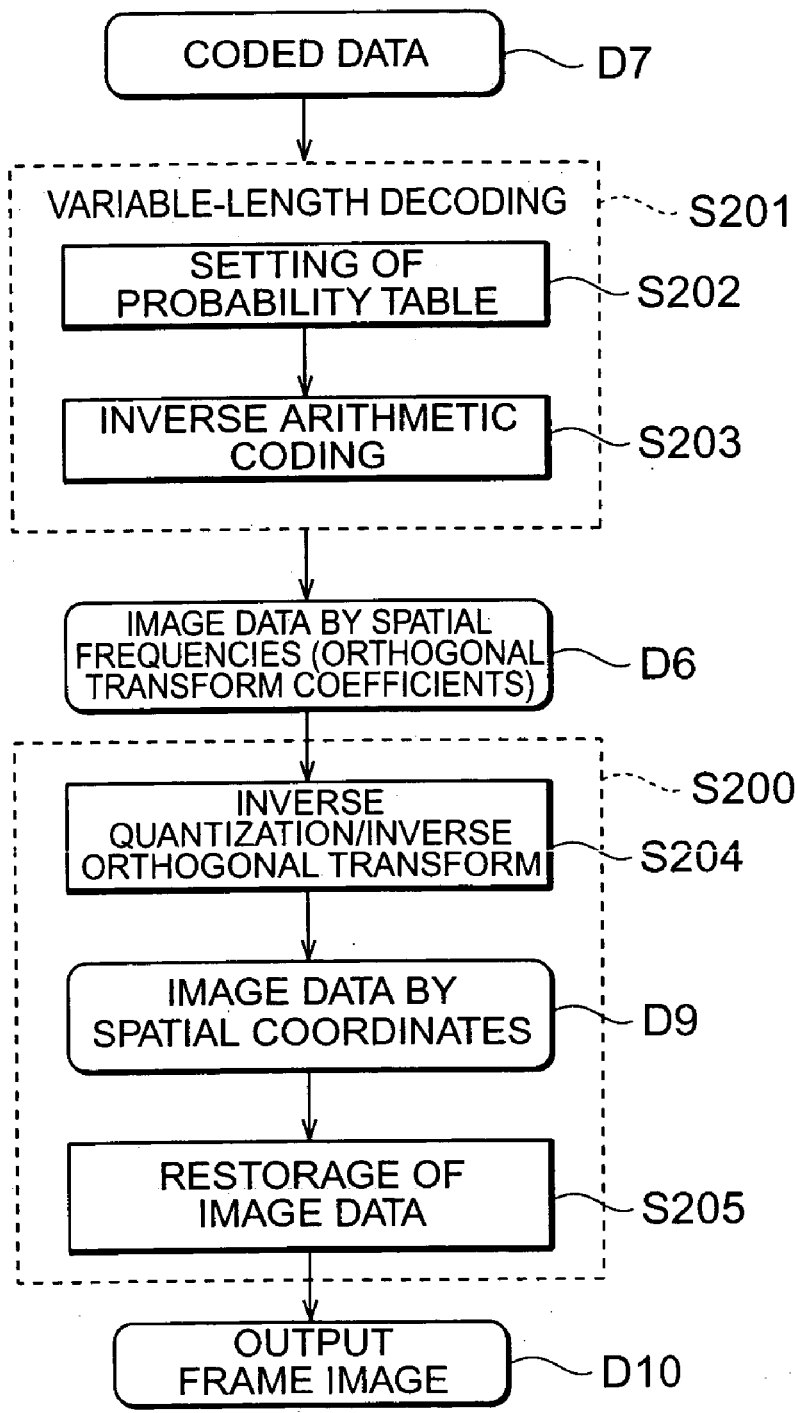
FIG. 9 is a flowchart schematically showing one embodiment of an image decoding method.

FIG. 9 is a flowchart schematically showing one embodiment of the image decoding method according to the present invention. This decoding method is an image decoding method, in which predetermined decoding and data restoration operations are carried out for the coded data D7 generated by the image coding method shown in FIG. 5, and an output frame image D10 is restored as an image corresponding to the input frame image D1.

In the image decoding method shown in FIG. 9, variable-length decoding is first carried out for the coded data D7 by use of inverse arithmetic coding, and a plurality of orthogonal transform coefficients (quantization coefficients) D6 as image data represented by spatial frequencies are generated (S201, decoding step). Specifically, a predetermined probability table is set as a probability table to be applied to the coded data D7 (S202). Then, the coded data D7 undergoes the inverse arithmetic coding by use of the set probability table (S203), thus obtaining the orthogonal transform coefficients D6 as frequency image data.

In the image decoding method of the embodiment, with respect to each slice layer in the coded data D7 having the hierarchy structure composed of slice layers and frame layers, from a header of a predetermined layer of the coded data D7 including the above slice layer, a flag indicating the presence of the initialization of the probability table to the slice layer is read, and the presence of the initialization of the probability table at the slice layer is thus set. Simultaneously, the probability table is initialized when the initialization is set to be present.

Next, the predetermined data restoration operation is performed for the orthogonal transform coefficients D6, which are the image data of the respective blocks in the frame image, thereby restoring the frame image (S200, a restoration step). In the embodiment, this restoration step is composed of two steps, which are S204 and S205.

Specifically, by sequentially performing inverse quantization operation and inverse orthogonal transform operation for the orthogonal transform coefficients D6, image data (spatial image data) D9 represented by the spatial coordinates is generated (S204, an inverse orthogonal transform step). Then, for the spatial image data D9, a predetermined data processing operation is performed to transform the image data, thus restoring the output frame image D10 (S205).

The effect of the image decoding method according to this embodiment will be described.

In the image decoding method shown in FIG. 9, after obtaining the image data D6 by performing the inverse arithmetic coding of the coded data D7 by use of the predetermined probability table, the data restoration operation is performed for the image data D6, thus restoring the frame image D10. Then, in the variable-length decoding for decoding the coded data D7, it is set whether or not the probability table is initialized at the respective slice layer, by use of the flag which indicates the presence of the initialization and read from the header of the predetermined layer.

Similarly to the foregoing case of the arithmetic coding, unnecessary initialization of the probability table at the slice layer can be accordingly prevented. Therefore, from the coded data D7 with the enhanced efficiency of the data compression, which is obtained by suitably setting the probability table over the entire coded data D7 having the hierarchy structure composed of slice layers and frame layers, the frame image can be suitably restored.

Figure 10:
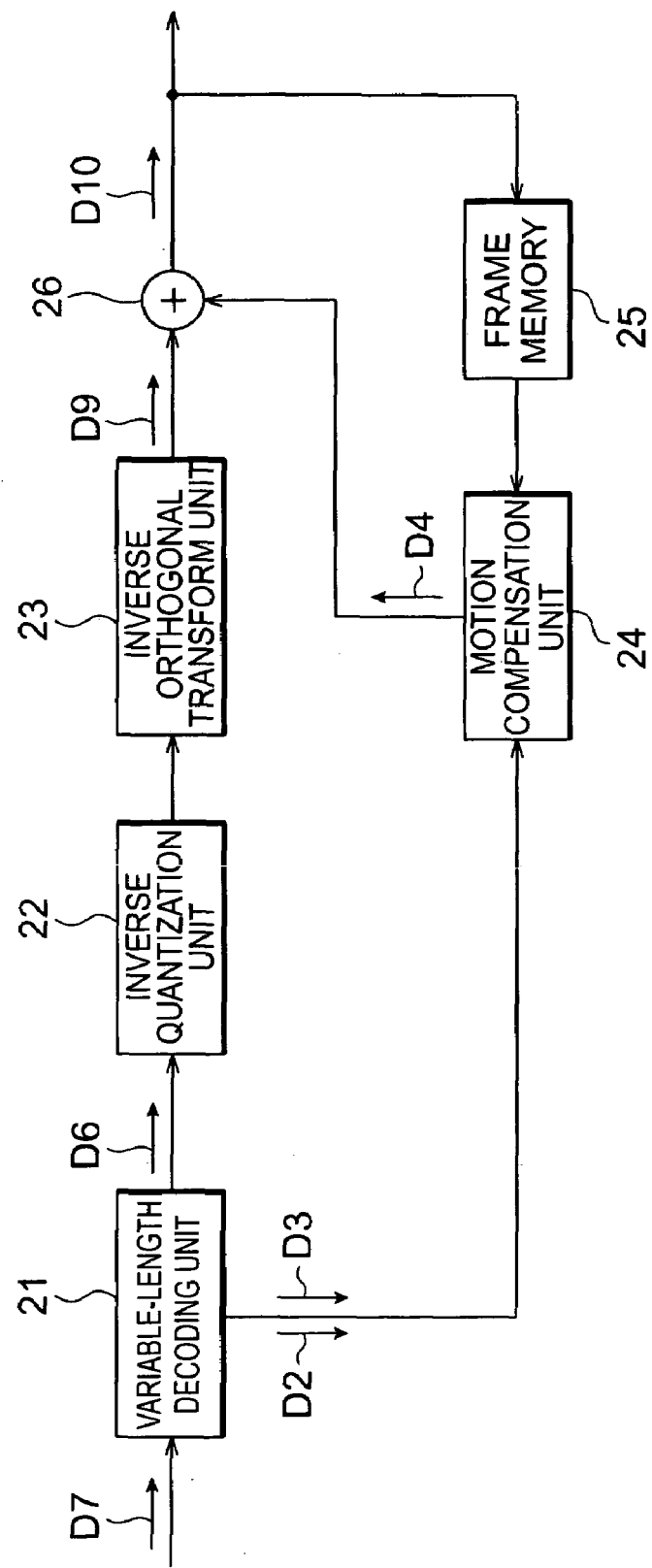
FIG. 10 is a block diagram illustrating a constitution of one embodiment of an image decoding apparatus.

FIG. 10 is a block diagram showing a constitution of one embodiment of the image decoding apparatus according to the present invention.

The coded data D7 to be inputted as an object to be decoded is inputted to the variable-length decoding unit (decoding means) 21 and undergoes the variable-length decoding by the inverse arithmetic coding using a predetermined probability table, and thus the orthogonal transform coefficients D6 as the image data are generated. For the coded data D7 subjected to the data compression, the variable-length decoding unit 21 detects the header of the frame layer, then decodes each piece of data included in the coded data D7 for each macroblock, and generates the orthogonal transform coefficients D6 as the frequency image data, the motion vector D2 and the like. Moreover, as to each slice layer included in the frame layer, the flag indicating the presence of the initialization of the probability table is read from the header of the predetermined layer, and the initialization of the probability table is performed if the initialization thereof is instructed.

The orthogonal transform coefficients D6 decoded by the variable-length decoding unit 21 are inputted to restoration means constituted by including an inverse quantization unit 22, an inverse orthogonal transform unit 23, a motion compensation unit 24 and an adder 26. The restoration means performs the predetermined data restoration operation for the orthogonal transform coefficients D6, which are the image data of the respective blocks in the frame image, thereby restoring the frame image D10.

First, the orthogonal transform coefficients D6 are subjected to the inverse quantization and inverse orthogonal transform by the inverse quantization unit 22 and inverse orthogonal transform unit (inverse orthogonal transform means) 23, respectively. Thus, a restoration difference frame image D9 that is the spatial image data is generated. This restoration difference frame image D9 is a frame image corresponding to the difference frame image D5 before the coding.

Meanwhile, the motion vector D2 is inputted to the motion compensation unit 24. In the motion compensation unit 24, the prediction frame image D4 is generated by use of the motion vector D2 from the variable-length decoding unit 21 and other frame images stored in the frame memory 25. Then, in the adder 26, the restored difference frame image D9 and the prediction frame image D4 are added together, and the restored frame image is outputted as the output frame image D10.

Here, processing activities of the image coding method executed in the above image coding apparatus are feasible by an image coding program for causing a computer to execute the image coding. Further, processing activities of the image decoding method executed in the above image decoding apparatus are feasible by an image decoding program for causing a computer to execute the image decoding.

For example, the image coding apparatus can be configured by using a CPU, a ROM connected to the CPU and storing respective software programs necessary for processing operations of the image coding, and a RAM connected to the CPU and temporarily storing data during execution of the program. In this configuration, the image coding apparatus is realized by executing the specific image coding program by the CPU.

Similarly, the image decoding apparatus can be configured by using a CPU, a ROM connected to the CPU and storing respective software programs necessary for processing operations of the image decoding, and a RAM connected to the CPU and temporarily storing data during execution of the program. In this configuration, the image decoding apparatus is realized by executing the specific image decoding program by the CPU.

Moreover, the foregoing program for allowing the CPU to execute the respective processing for image coding or image decoding is distributable by being recorded in a computer-readable record medium. Such a record medium includes, for example: a magnetic medium such as a hard disc, a flexible disk and the like; an optical medium such as a CD-ROM, a DVD-ROM and the like; a magneto-optical medium such as a floptical disk and the like; a hardware device such as, for example, a RAM, a ROM, a semiconductor nonvolatile memory and the like, which is specially disposed so as to execute or store program instructions; and the like.

Further, the foregoing program for causing the computer to execute the image coding or image decoding can be made into a computer data signal embodied in carrier wave. Accordingly, the image coding program or image decoding program can be carried through the cable or wireless carrying path or the like.

Hereinafter, taking an ITU-T H. 26L coding system as an example, specific description will be made for the setting of the presence of the initialization of the probability table at the slice layer and the addition of the flag to the coded data in the image coding method and image coding apparatus shown in FIGS. 5 and 6. Note that a setting method and the like described below can be similarly applied to the image decoding method and image decoding apparatus shown in FIGS. 9 and 10. Moreover, the specific coding system is not limited to the foregoing H. 26L coding system.

Figure 11A:
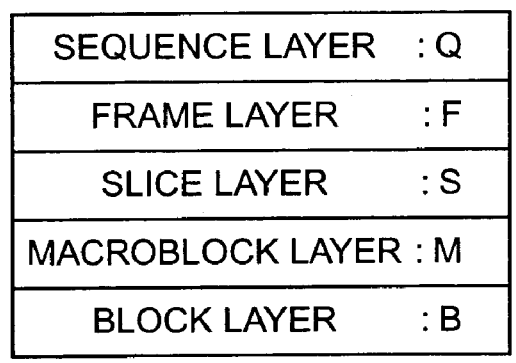
FIGS. 11A and 11B are views showing an example of a data structure of coded data.
Figure 11B:
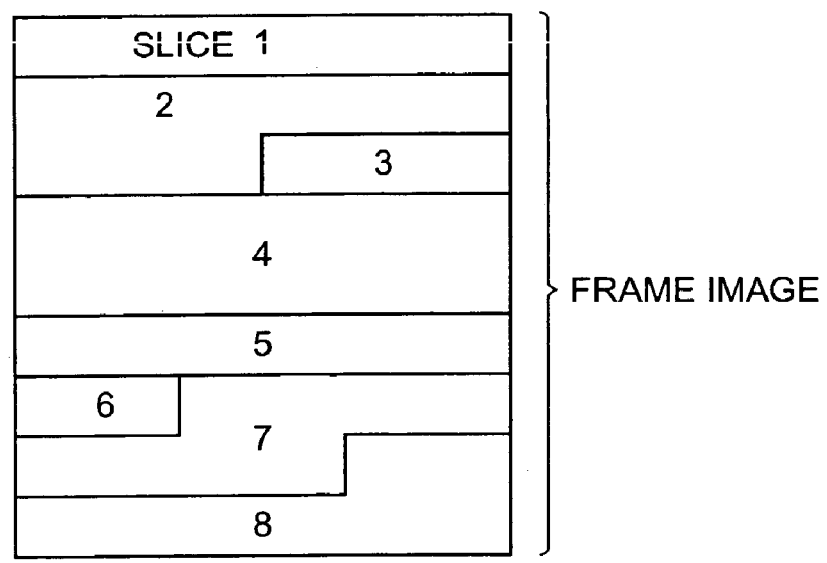
Figure 12:
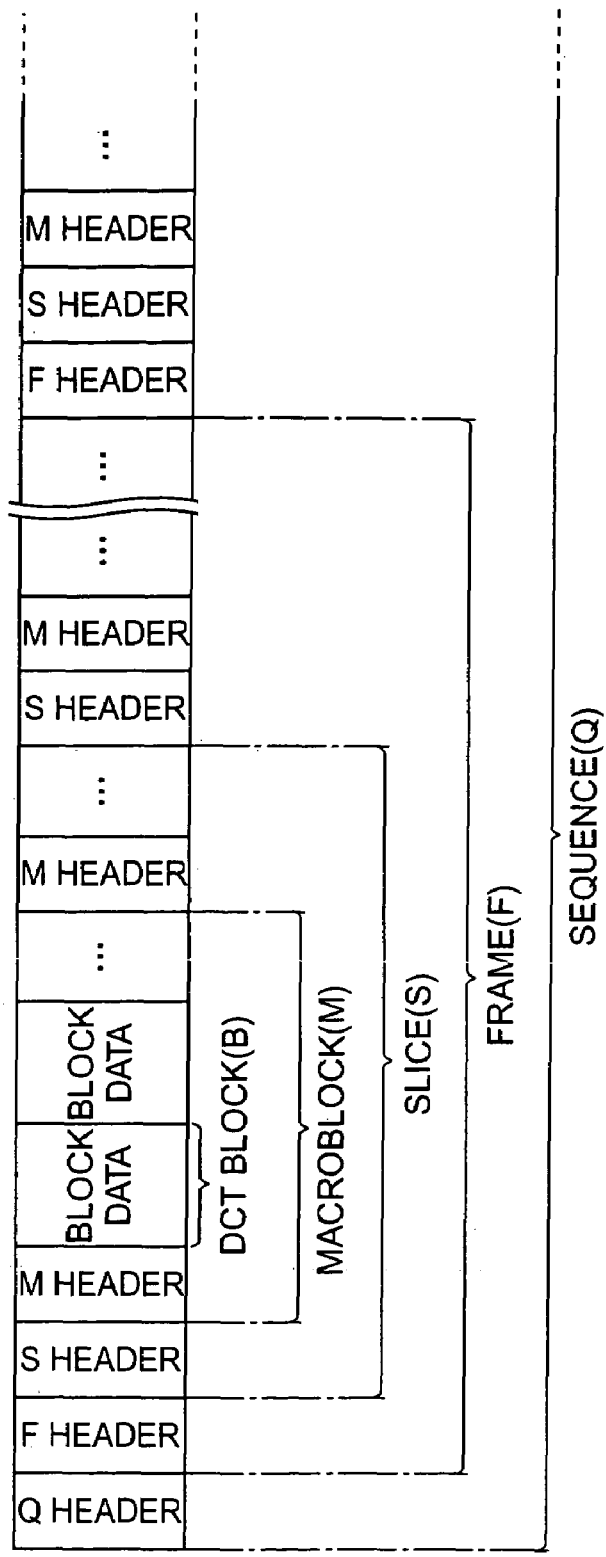
FIG. 12 is a view showing an example of a data sequence of the coded data.

FIGS. 11A and 11B are views showing an example of a data structure of coded data. FIG. 12 is a view showing an example of a data sequence of the coded data.

FIG. 11A is a view showing an example of a hierarchy structure of the coded data. In the data structure of the embodiment, the coded data has six layers including block layer (hereinafter referred to as B), macroblock layer (M), slice layer (S), frame layer (F) and sequence layer (Q) in the order from lower data.

The block layer B is a layer corresponding to a block to be a unit of transform in performing the orthogonal transform of the spatial image data into the frequency image data. For example, when the DCT is used as the orthogonal transform, the above-described block layer corresponds to the DCT block.

Moreover, the macroblock layer M is a layer corresponding to a macroblock to be a unit of prediction in performing the motion compensation inter-frame prediction for the image data. As shown in FIG. 12, this macroblock layer M is composed of a plurality of block layers B (for example, 24 DCT block layers including 16 luma DCT blocks and 8 chroma DCT blocks). Moreover, attribute information of the macroblock layer and the like is included in a header of the macroblock layer M (the M header shown in FIG. 12).

The slice layer S corresponds to each of image regions obtained by dividing one frame image into one or a plurality of regions. The layer putting together these divided slice layers S becomes the frame layer (picture layer) F corresponding to the frame image. The frame layer F is a layer corresponding to the frame image and becomes a basic unit of coding in the image coding.

In the coded data of the moving picture composed of a plurality of frame images in time-series, the layers including all the frame layers F are assumed to be the sequence layer Q. Moreover, as an intermediate layer between the frame layer F and the sequence layer Q, a GOP layer composed of a plurality of frame layers F may be provided.

FIG. 11B is a view showing an example of dividing the frame image into a plurality of slices. In preparation of the coded data, the frame image is divided into one or a plurality of slices (for example, 8 slices in FIG. 11B). These slices S are, as shown in FIG. 12, composed of one or a plurality of macroblocks M, and are constituted as an aggregate of the macroblocks, which begins from an upper left of the image and goes on to a lower right thereof in the order of a raster scanning. Here, 8 slices are different lengths from each other in FIG. 11B, however, these slices may be a same length.

In the coding and decoding of the image data, each of the slice layers S obtained by dividing the frame layer F is a layer to be a unit of synchronization recovery. For the synchronization recovery, a synchronization code is added to a slice header (S header) that is a header of the slice layer S.

In the above-described image coding method and apparatus, with respect to each slice layer S, it is set whether or not the probability table used for the arithmetic coding is initialized in the synchronization recovery by the synchronization code of the slice header. Then, a flag indicating the set presence of the initialization is added to a header of a predetermined layer including the slice layer S. Accordingly, unnecessary initialization of the probability table at the slice layer is prevented.

As to the header to which the flag is added, the flag indicating the presence of the initialization of the probability table to each slice layer S, a data structure is possible, in which, for example, the flag is added to the slice header (S header) of the slice layer itself subjected to the setting of the presence of the initialization. In this case, for each of slices included in a static picture or a moving picture, the presence of the initialization of the probability table at the slice layer can be set.

Moreover, a data structure is possible, in which the flag is added to a frame header (F header) of a frame layer including the slice layer subjected to the setting of the presence of the initialization. In this case, for each of frames included in a static picture or a moving picture, the presence of the initialization of the probability table at the slice layer can be set with respect to the respective slice layers included in the frame layer.

Alternatively, in the moving picture composed of a plurality of frame images, a data structure may also be used, in which the flag is added to a sequence header (Q header) of a sequence layer that is a layer including the whole layers. Thus, for the entire moving picture (video) composed of the plurality of frame images, the presence of the initialization of the probability table at the slice layer can be set.

Moreover, in the case that the data sequence of the coded data does not have the data format shown in FIG. 12, and the data sequence is transmitted as the packet data, the synchronization code is not added to the slice layer. In this case, the flag indicating the set presence of the initialization can be added to a header part of the packet.

Note that, regarding the presence of the initialization of the probability table, which is instructed by the flag, in the case where a plurality of probability tables are used such as the case of applying different probability tables to the luma block and the chroma block, respectively, in the arithmetic coding of the image data, the instruction of the presence of the initialization may be made independently to the plurality of probability tables. Alternatively, the instruction thereof may also be made to the whole of the plurality of probability tables. Moreover, the instruction of the presence of the initialization of the probability table may similarly be made, as to the probability table applied to the motion vector and the coding mode information.

Regarding the method of setting the presence of the initialization of the probability table to each slice layer, the presence of the initialization may be previously set to syntax or the probability table. Alternatively, the setting can be made also by switching the presence and absence of the initialization according to the need.

Figure 13:
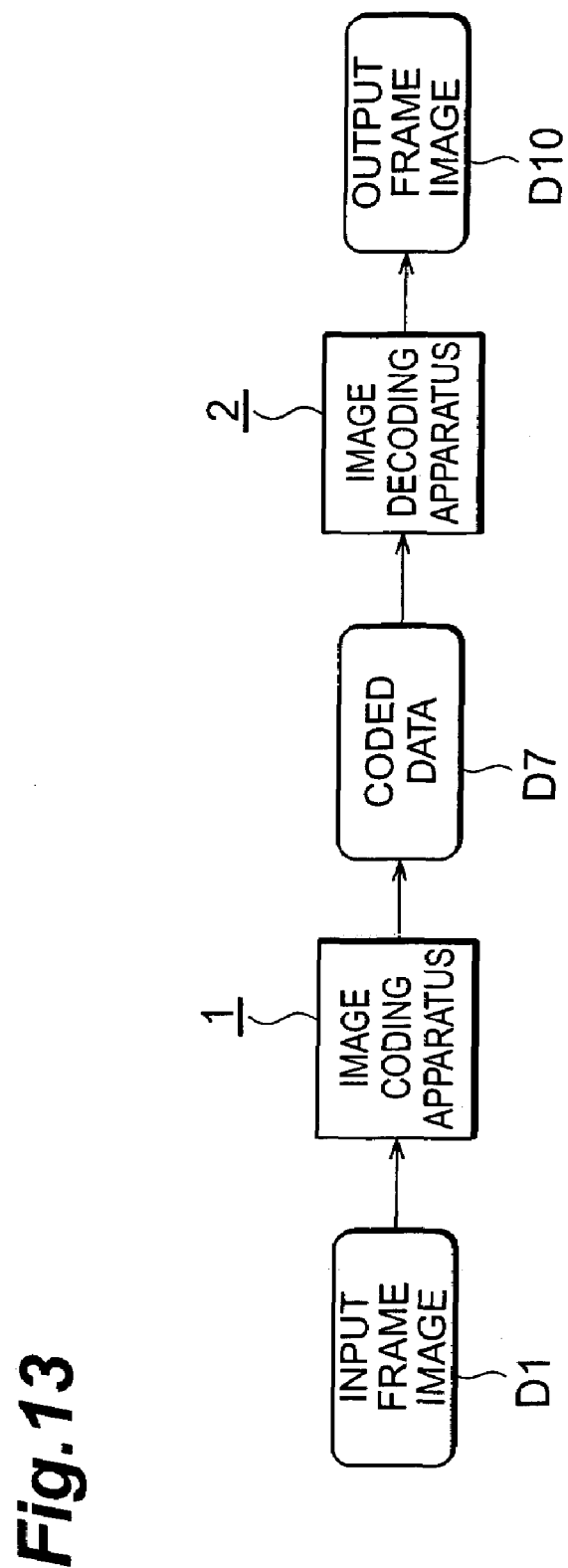
FIG. 13 is a schematic diagram showing a constitution of one embodiment of an image transmission system.

FIG. 13 is a schematic diagram showing a constitution of one embodiment of an image transmission system (for example, a mobile video transmission system) according to the present invention. This image transmission system is constituted by including: the image coding apparatus (for example, the image coding apparatus shown in FIG. 6) 1 that realizes the image coding method shown in FIG. 5; and the image decoding apparatus (for example, the image decoding apparatus shown in FIG. 10) 2 that realizes the image decoding method shown in FIG. 9.

In this system, the input frame image D1 is coded in the image coding apparatus 1, the coded data D7 is generated, and the coded data D7 is outputted to a predetermined wired or radio transmission path. Then, the coded data D7 transmitted from the image coding apparatus 1 through the transmission path is inputted to the image decoding apparatus 2, and is restored as an output frame image D10.

With such an image transmission system, the image can be transmitted efficiently by use of the coded data with the enhanced efficiency of the data compression, which has the probability table suitably set over the entire coded data.

INDUSTRIAL APPLICABILITY

As described above in detail, the image coding method, image decoding method, image coding apparatus, image decoding apparatus, program, computer data signal, and image transmission system of the present invention are applicable as a method and apparatus and the like which are capable of enhancing the efficiency of the data compression by the coded data in a manner that the probability table is suitably set over the entire coded data having a hierarchy structure composed of slice layers and frame layers.

Namely, according to the configuration in which, in the variable-length coding which generates the coded data by subjecting the image data to the arithmetic coding, for the slice layer, it is set whether or not the probability table is initialized at the slice layer, and the flag indicating the presence of the initialization is added to the header of the predetermined layer, unnecessary initialization of the probability table at the slice layer can be prevented. Therefore, the probability table is suitably set over the entire coded data having the hierarchy structure composed of slice layers and frame layers, and thus the efficiency of the data compression by the coded data can be enhanced.

The invention claimed is:

1. A processor-implemented image coding method for dividing a frame image into blocks of a specific size and coding image data for each of the blocks to form a coded image that is configured to be decoded and then displayed by a device, the method comprising:
    a transform step of preparing image data that is a coded object by performing a predetermined data transform operation for respective images of the blocks in the frame image; and
    a coding step of subjecting the image data to variable-length coding by arithmetic coding using a predetermined probability table and of generating coded data having a hierarchy structure composed of a slice layer made of a plurality of the blocks, and a frame layer which is made of one or a plurality of the slice layers and corresponds to the frame image, wherein
    in the coding step, the presence of initialization of the probability table is set for the slice layer, a flag indicating the set presence of the initialization is added to a header of a predetermined layer of the coded data including the slice layer, and the probability table is initialized when the initialization is set to be present, and
    said coded image is configured to be transmitted to the device for seubsequent decoding and displaying.

2. The image coding method of claim 1, wherein, in the coding step, the flag is added to any one of header of the slice layer itself and the frame layer including the slice layer.

3. The image coding method of claim 1, wherein, in the coding step, the flag is added to a header of a sequence layer composed of a plurality of the frame layers.

4. A processor-implemented image decoding method for dividing a frame image into blocks of a specific size and decoding coded data obtained from a received coded image having coded image data for each of the blocks, the method comprising:
    a decoding step of generating image data by subjecting the coded data to variable-length decoding by inverse arithmetic coding using a predetermined probability table, the coded data having a hierarchy structure composed of a slice layer made of a plurality of the blocks, and a frame layer which is made of one or a plurality of the slice layers and corresponds to the frame image; and
    a restoration step of restoring the frame image to be displayed on a display of a device by performing a predetermined data restoration operation for the image data of the respective blocks in the frame image, wherein
    in the decoding step, from a header of a predetermined layer in the coded data including the slice layer, a flag indicating the presence of initialization of the probability table with respect to the slice layer is read, the presence of the initialization of the probability table is set, and the probability table is initialized when the initialization is set to be present.

5. The image decoding method of claim 4, wherein, in the decoding step, the flag is read from any one of header of the slice layer itself and the frame layer including the slice layer.

6. The image decoding method of claim 4, wherein, in the decoding step, the flag is read from a header of a sequence layer composed of a plurality of the frame layers.

7. An image coding apparatus for dividing a frame image into blocks of a specific size and coding image data for each of the blocks, the apparatus comprising:
    transform means for preparing image data that is a coded object by performing a predetermined data transform operation for respective images of the blocks in the frame image; and
    coding means for subjecting the image data to variable-length coding by arithmetic coding using a predetermined probability table and for generating coded data having a hierarchy structure composed of a slice layer made of a plurality of the blocks, and a frame layer which is made of one or a plurality of the slice layers and corresponds to the frame image, wherein
    by the coding means, the presence of initialization of the probability table is set for the slice layer, a flag indicating the set presence of the initialization is added to a header of a predetermined layer of the coded data including the slice layer, and the probability table is initialized when the initialization is set to be present.

8. The image coding apparatus of claim 7, wherein, by the coding means, the flag is added to any one of header of the slice layer itself and the frame layer including the slice layer.

9. The image coding apparatus of claim 7, wherein, by the coding means, the flag is added to a header of a sequence layer composed of a plurality of the frame layers.

10. An image decoding apparatus for dividing a frame image into blocks of a specific size and decoding coded data obtained by coding image data for each of the blocks, the apparatus comprising:

decoding means for generating image data by subjecting the coded data to variable-length decoding by inverse arithmetic coding using a predetermined probability table, the coded data having a hierarchy structure composed of a slice layer made of a plurality of the blocks, and a frame layer which is made of one or a plurality of the slice layers and corresponds to the frame image; and restoration means for restoring the frame image by performing a predetermined data restoration operation for the image data of the respective blocks in the frame image, wherein by the decoding means, from a header of a predetermined layer in the coded data including the slice layer, a flag indicating the presence of initialization of the probability table with respect to the slice layer is read, the presence of the initialization of the probability table is set, and the probability table is initialized when the initialization is set to be present.

11. The image decoding apparatus of claim 10, wherein, by the decoding means, the flag is read from any one of header of the slice layer itself and the frame layer including the slice layer.

12. The image decoding apparatus of claim 10, wherein, by the decoding means, the flag is read from a header of a sequence layer composed of a plurality of the frame layers.

13. A computer program product having computer readable instructions that when executed by a processor cause the processor to execute the image coding method of claim 1.

14. A computer program product having computer readable instructions that when executed by a processor cause the processor to execute the image decoding method of claim 4.

15. An image transmission system for dividing a frame image into blocks of a specific size and transmitting the frame image in accordance with coded data obtained by coding image data for each of the blocks, the system comprising:

the image coding apparatus of claim 7, which generates the coded data from the frame image and outputs the coded data; and an image decoding apparatus, which receives the coded data from the image coding apparatus and restores the frame image.

* * * * *